(12) United States Patent
Taniguchi et al.

(10) Patent No.: US 7,576,315 B2
(45) Date of Patent: Aug. 18, 2009

(54) SCANNING TYPE IMAGE DISPLAY APPARATUS HAVING A SYNCHRONIZATION CONTROL CIRCUIT AND A LIGHT TRANSMITTING AREA ON THE LAST SURFACE OF A SCANNING OPTICAL SYSTEM

(75) Inventors: Naosato Taniguchi, Saitama (JP);
Shuichi Kobayashi, Yokohama (JP);
Akira Yamamoto, Yokohama (JP)

(73) Assignee: Canon Kabushiki Kaisha (JP)

( * ) Notice: Subject to any disclaimer, the term of this patent is extended or adjusted under 35 U.S.C. 154(b) by 632 days.

(21) Appl. No.: 11/361,507

(22) Filed: Feb. 24, 2006

(65) Prior Publication Data
US 2006/0192094 A1    Aug. 31, 2006

(30) Foreign Application Priority Data
Feb. 25, 2005    (JP) .............................. 2005-050258

(51) Int. Cl.
*H01J 3/14* (2006.01)
(52) U.S. Cl. ...................................... 250/235; 250/205
(58) Field of Classification Search .............. 250/208.1, 250/205, 234–236, 216; 359/196, 216–219; 358/474, 475, 481; 347/253, 236, 246; 348/744, 348/756, 759; 345/207, 213, 214
See application file for complete search history.

(56) References Cited
U.S. PATENT DOCUMENTS
5,467,104 A    11/1995    Furness, III et al.
5,489,950 A    2/1996    Masuda
5,606,447 A    2/1997    Asada et al.
5,771,115 A *    6/1998    Takanashi .................... 359/208
5,886,805 A *    3/1999    Park ........................... 359/196

FOREIGN PATENT DOCUMENTS
JP          8-334723       12/1996
JP          9-230276        9/1997
JP         2003-57577       2/2003
JP         2003-57586       2/2003

OTHER PUBLICATIONS
Helsel et al, "Wafer Scale Packaging for a MEMS Video Scanner", Microvision, Inc., SPIE—The International Society for Optical Engineering, MEMS Design, Fabrication, Characterization and Packaging Conference, May 30-Jun. 1, 2001, vol. 4407, pp. 214-220.

* cited by examiner

*Primary Examiner*—Que T Le
(74) *Attorney, Agent, or Firm*—Rossi, Kimms & McDowell LLP (57) ABSTRACT

A scanning type image display apparatus includes a synchronization control circuit that enables a scanning unit to synchronize the forward paths and backward paths. The scanning type image display apparatus comprises a light source, scanning unit for scanning the light beam in two dimensional directions, a scanning optical system for forming an image of the light source on a surface to be scanned, the last surface of the scanning optical system including a reflecting area that reflects an effective light beam for forming an image on the surface to be scanned and a light transmission portion provided outside the reflecting area, light beam detection unit for detecting a light beam transmitted through the light transmission portion, and a synchronization control circuit that controls light emitting timing of the light source based on a signal from the light beam detection means.

8 Claims, 5 Drawing Sheets

SCANNING TYPE IMAGE DISPLAY APPARATUS HAVING A SYNCHRONIZATION CONTROL CIRCUIT AND A LIGHT TRANSMITTING AREA ON THE LAST SURFACE OF A SCANNING OPTICAL SYSTEM

BACKGROUND OF THE INVENTION

1. Field of the Invention

The present invention relates to a scanning type display apparatus that displays an image by scanning a light beam emitted from a light source two-dimensionally.

2. Related Background Art

In some image display apparatuses for head mounted display apparatuses and digital cameras, a two-dimensional display element such as a transmission type liquid crystal, a reflection type liquid crystal and an organic EL element is used in combination with an eyepiece optical system to allow a viewer to view an image on the two-dimensional display element as a virtual image. Such image display apparatuses are required to produce high definition images.

However, in the above-mentioned two-dimensional display element, since pixels of a required pixel number are formed on the display device, pixel defects increase with an increase in the pixel number. In addition, manufacturing of the two-dimensional display element is difficult since the size of each pixel is small relative to the size of the device.

There has been also proposed an image display apparatus in which a one-dimensional type display element and scanning means are used in combination and two-dimensional display is realized by synchronizing an image displayed on the one dimensional display device and scanning to achieve two-dimensional display. However, in such apparatuses an increase in the resolution involves an increase in the number of pixels of the one-dimensional type display element, which leads to the problems same as those of the two-dimensional display element.

On the other hand, in an already disclosed image display apparatus that does not use a two-dimensional display element or a one-dimensional type display element but displays an image by scanning a light beam emitted from a light source using two-dimensional light beam scanning means. In the technology disclosed in U.S. Pat. No. 5,467,104, light beams of red, blue and green are scanned two-dimensionally in the horizontal and vertical directions, so that an image is formed on the retina of a viewer's eye through an optical system.

As per the above, in the case of the display apparatus in which a light beam is scanned, it is not necessary to form pixels corresponding to required resolution unlike with the case of a two-dimensional or one-dimensional image display element. In addition, such an apparatus will not suffer from pixel defects in principle.

In realizing such a scanning type image display apparatus, micro electron mechanical systems (MEMS) manufactured through a semiconductor process have been gathering attention for use as light beam scanning means. The light beam scanning means manufactured based on MEMS technologies are suitable for image display apparatuses, since they are small in size and light in weight and can operate at high speed. As light beam scanning means based on MEMS technologies, planar type galvano mirror and its manufacturing method (U.S. Pat. No. 5,606,447) and a light deflecting element (Japanese Patent Application Laid-Open No. H08-334723) have been disclosed. An MEMS of a two-dimensional scanning means for a head mounted display apparatus is disclosed in "Wafer Scale Packaging for a MEMS Video Scanner" SPIE, Conference #4407-29, June 2001.

The light beam scanning means based on the MEMS technologies resonates a light reflection surface by a torsion bar or the like to deflect and scan a light beam incident on the reflection surface. Since torsion is utilized, the light reflection surface is not rotated but oscillated. When use is made of such light beam scanning means, the number of scanning lines can be increased if both forward motion and backward motion in oscillation are used, namely if both scanning from right to left and scanning from left to right are utilized. Such scanning is referred to as reciprocating scanning. By effecting scanning in the direction perpendicular to the reciprocating scanning in addition to the reciprocating scanning, two-dimensional reciprocating raster scanning can be realized. In the case where an image is displayed by reciprocating raster scanning, it is important to synchronize image-drawing in the forward path and in the backward path.

Since scanning motion realized by oscillation is sinusoidal, the larger the amplitude of deflection is, the lower the speed is, and the speed becomes zero at the maximum amplitude. Therefore, it is necessary to design the scanning area in which an image is formed (or the effective scanning area) smaller than the entire scanning angle (or the entire deflection angle).

In connection with synchronization methods in scanning type image display apparatus or reciprocating scanning, a projection type display apparatus has been disclosed (U.S. Pat. No. 5,489,950). Another document discloses an light beam scanning apparatus, a oscillation member for use in a light beam scanning apparatus and an image forming apparatus equipped with a light beam scanning apparatus (Japanese Patent Application Laid-Open No. 2003-57586). Furthermore, a light beam scanning apparatus (Japanese Patent Application Laid-Open No. H09-230276), a light beam scanning apparatus and an actuator (Japanese Patent Application Laid-Open No. 2003-57577) have been disclosed.

U.S. Pat. No. 5,489,950 relates to synchronization in a display apparatus that deflects and scans a one-dimensional image using a deflecting mirror to project a two-dimensional image. This apparatus detects the angle displacement of the deflecting mirror that oscillates over a specific angle range at a constant cycle by means of a detector attached to the deflecting mirror and generates synchronization timing based on a signal of the detector.

Japanese Patent Application Laid-Open No. 2003-57586 discloses a technology for a light beam scanning type display apparatus that utilizes an MEMS micro mirror. In the technology disclosed in Japanese Patent Application Laid-Open No. 2003-57586, light beams from red, green and blue laser sources are color-composited and guided to an optical fiber optical system. The light beam exiting from the optical fiber optical system is collimated by a collimation optical system, and then made incident on horizontal scanning means to scan the light beam horizontally. The light beam from the horizontal scanning means is made incident on the vertical scanning means via a relay optical system and scanned in the vertical direction. After that, the scanned light is made incident on a viewer's eye via a second relay optical system. In this arrangement, a beam detection sensor (BD sensor) is provided between the horizontal scanning means and the vertical scanning means. An electric signal that is generated when the scanning light beam passes over the BD sensor is sent to a BD signal detection circuit. Start timing of an image signal is determined based on this signal.

Japanese Patent Application Laid-Open No. H09-230276 discloses a light beam scanning apparatus that deflects a laser beam by sinusoidal oscillation. This document discloses correction of a difference in the scanning start points between the forward path and the backward path caused by variations in the deflection frequency, and light beam emitting means is controlled in such a way that the start points coincides with each other. Japanese Patent Application Laid-Open No. 2003-57577 teaches to prevent interference of optical path by entering a second light beam used for generating a light-reception output to a deflector in addition to a first light beam for scanning an effective scanning area. The light-reception output is used for synchronizing the forward path and the backward path in oscillating operation of scanning means in a scanning type image display apparatus having the scanning means for two-dimensionally scanning a light beam emitted from a light source.

U. S. Pat. No. 5,489,950 relates to synchronization in a display apparatus that deflects and scans a one-dimensional image by a deflecting mirror to project it as a two-dimensional image. The apparatus uses a drive signal and a mirror deflection angle detection means in synchronizing the mirror and the image. Since the scanning light is not detected in this apparatus, sufficient accuracy is not realized in some cases.

In the technology disclosed in Japanese Patent Application Laid-Open No. 2003-57586, BD synchronization detection is effected based on a light beam scanned by horizontal scanning means. However, since no optical system is provided between the horizontal scanning means and a BD optical sensor, overlapping of the effective beam and the beam for beam detection (BD) is likely to occur.

Japanese Patent Application Laid-Open No. H09-230276 discloses an optical configuration in which scanning start points in the forward path and in the backward path in sinusoidal oscillation coincide with each other. However, this configuration is designed to scan a specific surface to be scanned by one-dimensional scanning means to form an image on the surface to be scanned. Moreover, in this configuration, first and second light detectors are disposed in deflection angle ranges inside the entire deflection angle range of oscillating scanning means but outside the effective deflection angle range. Accordingly, if the space between the effective deflection angle and the optical path for the light detector is narrow, interference of the optical path occurs, and a loss of the light quantity of the effective beam arises.

In the configuration disclosed in Japanese Patent Application Laid-Open No. 2003-57577, since the second beam for generating a light-reception output different than the first beam for scanning the effective scanning area is made incident on the deflector, interference of the optical path does not occur. However, use of two different beams makes the structure complex.

SUMMARY OF THE INVENTION

According to the present invention, there is provided a scanning type image display apparatus comprises a light source for emitting a light beam that is modulated based on image information, scanning means for scanning the light beam in two dimensional directions, a scanning optical system for forming an image of the light source on a surface to be scanned, the last surface of the scanning optical system including a reflecting area that reflects an effective light beam for forming an image on the surface to be scanned and a light transmission portion provided outside the reflecting area, light beam detection means for detecting a light beam transmitted through the light transmission portion, and a synchronization control circuit that controls light emitting timing of the light source based on a signal from the light beam detection means.

DETAILED DESCRIPTION OF THE PREFERRED EMBODIMENTS

First Embodiment

Figure 1:
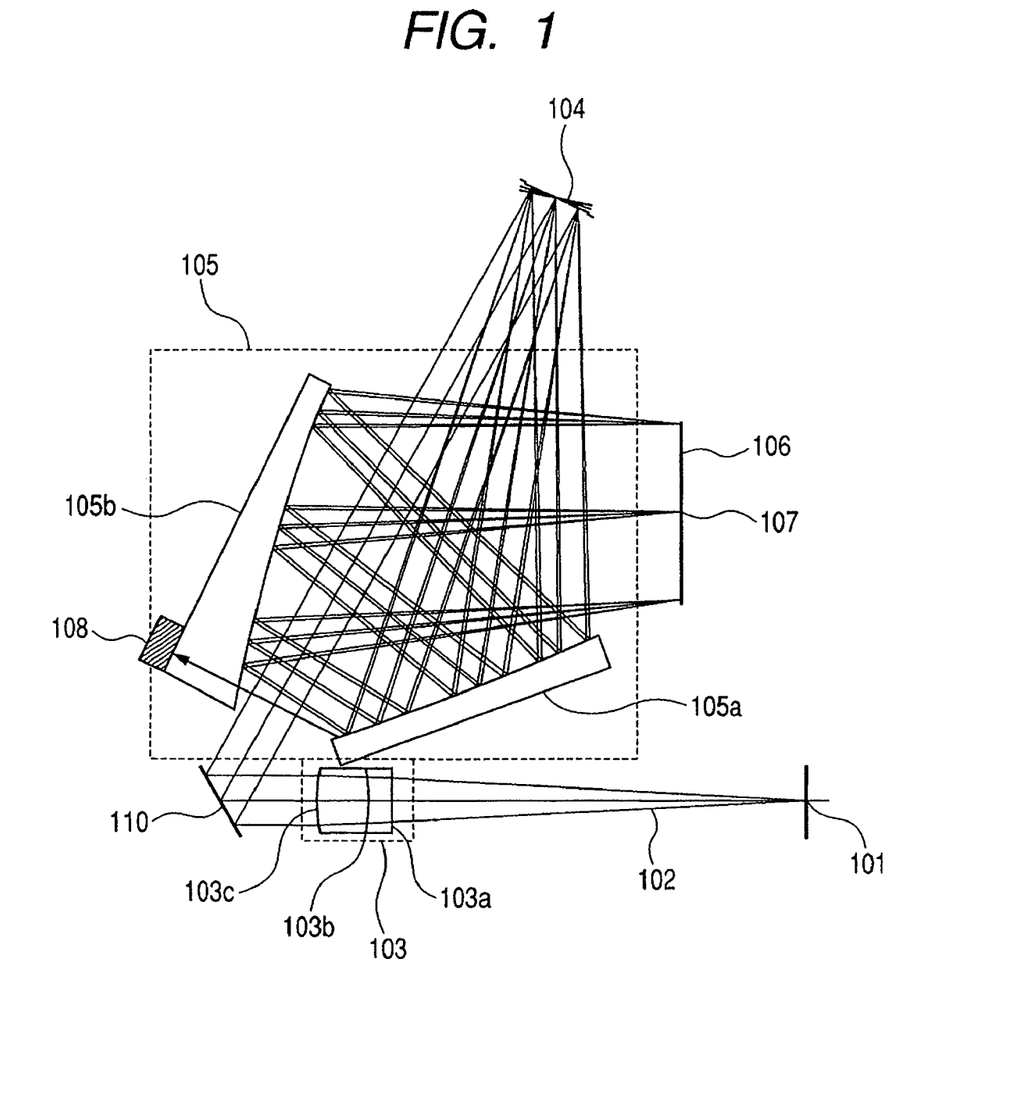
FIG. 1 schematically shows the configuration of a first embodiment of the present invention.

FIG. 1 is a vertical cross sectional view of a scanning type image display apparatus. A light source 101 is directly modulated based on an input signal for a displayed image not shown. A light beam 102 emitted from the light source 101 is collimated by a light source optical system 103 and incident on scanning means 104. The light source 102 is scanned by the scanning means 104 two-dimensionally and incident on a scanning optical system 105. The scanning optical system 105 is composed of two surface reflecting mirrors 105a, 105b having positive powers. The light beam incident on the scanning optical system 105 is reflected by the surface reflecting mirror 105a and the surface reflecting mirror 105b, which are arranged in the mentioned order from the scanning means side, and focused in a spot 107 on or in the neighborhood of a surface to be scanned 106. As the light beam 102 is scanned by the scanning means 104, the spot 107 travels on the surface to be scanned 106 two-dimensionally to form a two-dimensional image on that surface in accordance with modulation of the light source 101.

Next, detection of synchronization of the scan image in the scanning type display apparatus according to this embodiment will be described. Synchronization light detection means 108 is disposed in the vicinity of the last surface 105b of the scanning optical system at a position corresponding to the outside of the area in which an image is actually displayed. On a portion of the last reflecting surface 105b corresponding to the outside of the image formation area is formed not a reflecting mirror but a transmitting surface, and timing of the scanning light transmitted through the transmitting surface is detected by the synchronization light detection means 108. By forming a transmitting surface for allowing light to enter the synchronization light detection means 108 on a portion on the last exit surface 105b corresponding to the outside of the image formation area, it is possible to enhance accuracy in setting the position of the synchronization light detection means 108. In addition, interference with the optical path of the scanning light for actually displaying an image is prevented, and accordingly, a decrease in the brightness of the displayed image will not occur.

Figure 2:
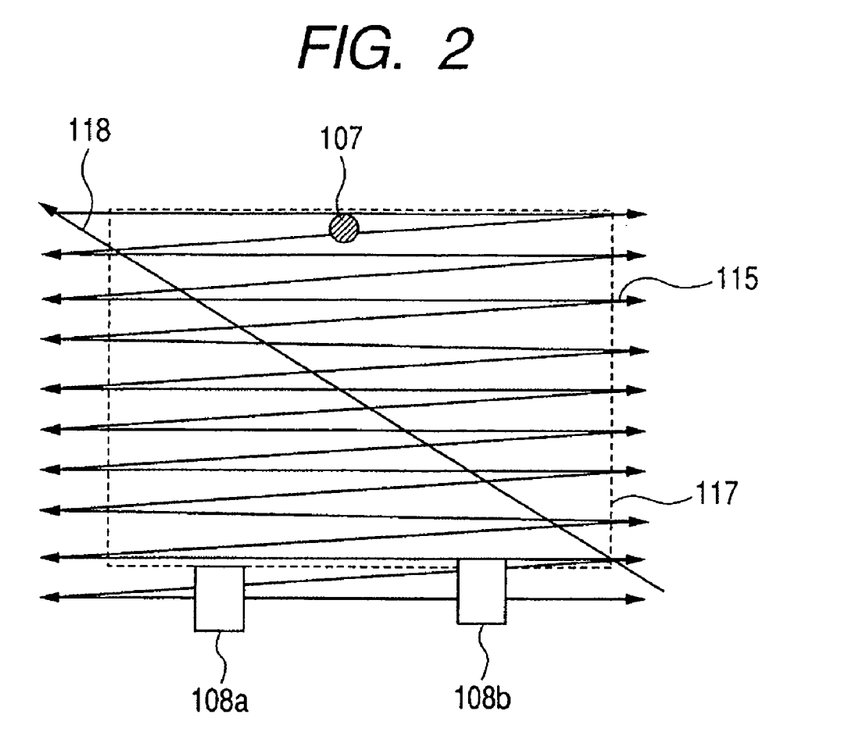
FIG. 2 illustrates the position of synchronization light detection means.
Figure 3:
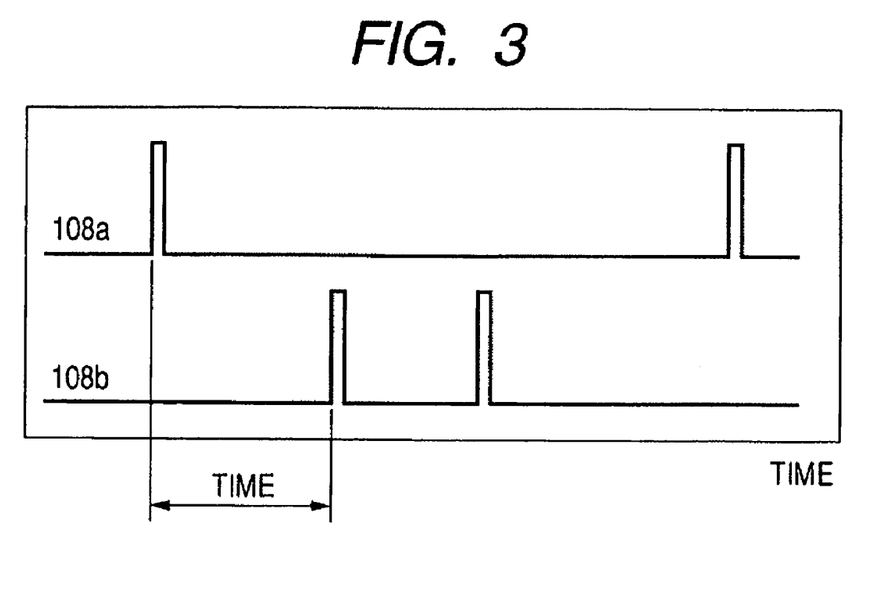
FIG. 3 shows output signals of the synchronization light detection means.
Figure 4A:
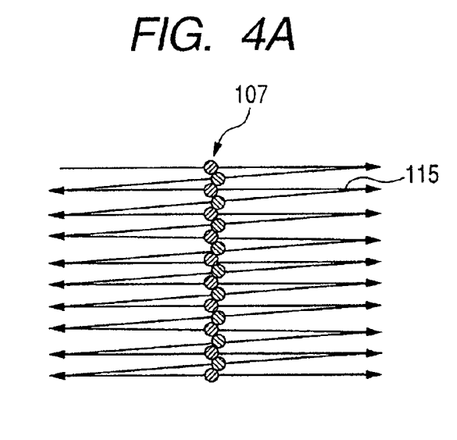
FIGS. 4A and 4B illustrate presence/absence of positional differences between forward paths and backward path in scanning.
Figure 4B:
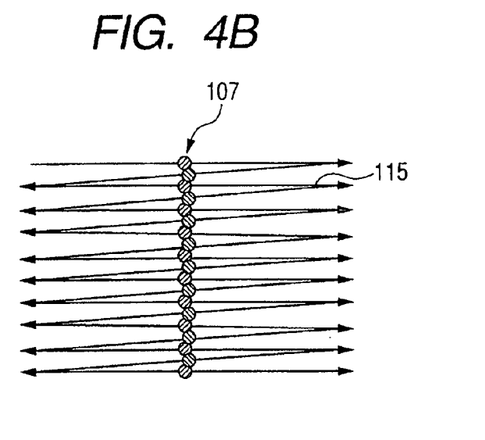

FIG. 2 schematically shows how the surface to be scanned 106 is scanned with he spot 107. Area 117 is an effective area for actually displaying an image, and arrows 115 indicate an example of scanning lines. Reciprocating raster scanning of the surface to be scanned 106 is performed in the order indicated by the arrows 115. In effect, synchronization light detection means 108a, 108b are disposed in the vicinity of the last surface 105b of the scanning optical system, as shown in FIG. 1. Here, their operations will be described in association with scanning lines on the surface to be scanned 106. Specifically, the synchronization light detection means 108a, 108b are disposed at positions corresponding to a portion on the surface to be scanned 106 outside the area 117 in which an image is actually displayed. The synchronization light detection means 108a, 108b are electrically connected with a synchronization detection circuit and a control circuit of the scanning type image display apparatus, both of which are not shown in the drawings and controlled based on signals from the synchronization light detection means 108a, 108b. Horizontal scanning is performed by oscillating operation as reciprocating scanning, and vertical scanning is performed in the direction perpendicular thereto. After vertical scanning, the scanning line returns as indicated by arrow 118, and scanning is repeated. The area on the surface to be scanned 106 in which an image is actually displayed is the effective area 117. There are over-scan areas outside the effective area 117 with respect to both the horizontal and vertical directions. Desired images are displayed on the effective area 117. In the over-scan area where the synchronization light detection means 108a, 108b are disposed, light is continuously emitted from the light source in order to detect synchronization. Light signals of the synchronization light detection means 108a, 108b while light is continuously emitted are shown in FIG. 3. The synchronization light detection means 108a, 108b detect time intervals of the detected light beams. For example, in view of the difference between the forward path and the backward path with reference to the forward path of scanning in the direction indicated by 115, the detection interval in the synchronization light detection means 108a is longer than that of the synchronization light detection means 108b, with respect to the horizontal direction. By adjusting spot formation timing based on this detection time, it is possible to control the pixel positions in the forward path and the backward path correctly. FIG. 4A shows a case where there is a difference in timing of light emission from the light source between the forward path and the backward path of reciprocating scanning. By controlling timing of emission from the light source based on the time intervals detected by the synchronization light detection means 108a, 108b, it is possible to match the timing as shown in FIG. 4B.

Since the scanning optical system 105 is composed only of reflecting surfaces, no chromatic aberration is generated in the scanning optical system. Accordingly, it is possible to provide images having higher image quality as compared to cases where an optical system including optical transmitting surface such as a prism are used. The two reflecting mirrors 105a, 105b are constructed as non-rotational-symmetry surfaces that have no rotational symmetry axis. The shapes of the reflecting mirrors 105a, 105b are free curved surfaces represented by a polynomial of X and Y represented by following equation (1).

$$Z = \frac{\frac{Y^2}{R}}{1 + \sqrt{1 - (1+k) \times \left(\frac{Y}{R}\right)^2}} + \sum C_{mn} X^m Y^n \quad (1)$$

where,
R: radius of curvature
k: conic constant
$C_{mn}$: coefficient for $X^m Y^n$
m, n: integer (m+n≦8).

By designing the two reflecting surfaces that constitute the scanning optical system to have positive powers, it is possible to make the scanning optical system telecentric. With the telecentricity, it is possible to make changes in the magnification and distortion of an image small when diopter adjustment is effected by an eyepiece optical system disposed in rear of the surface to be scanned 106. In addition, by distributing power to the two reflecting mirrors, it is possible to reduce aberrations.

In this arrangement, the space between the two reflecting mirrors 105a, 105b is utilized to guide the light beam 102 to the scanning means 104. By guiding the light beam 102 to the scanning means 104 through between the two reflecting mirrors, it is possible to make the angle of incidence on the scanning means 104 as small as 10 degrees. This makes it possible to make distortion that may be caused by oblique incidence of the light beam 102 on the scanning means 104 small.

Figure 5A:
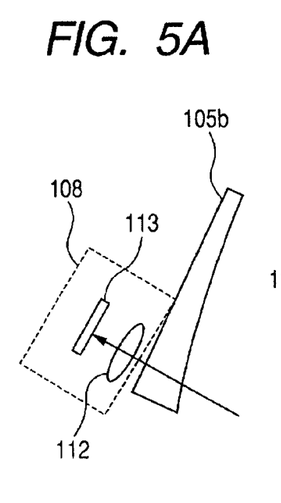
FIGS. 5A, 5B and 5C show other modes of synchronization light detection means.
Figure 5B:
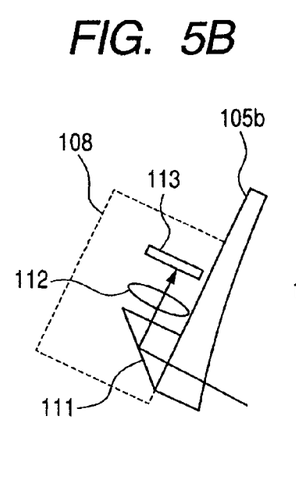
Figure 5C:
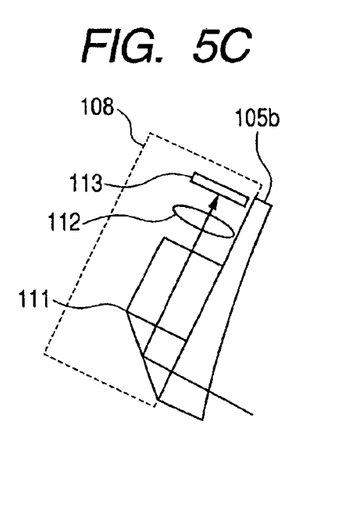

In this exemplary embodiment, the synchronization light detection means 108 such as a PD sensor is directly provided on the rear side of the last reflecting surface 105b in the vicinity of a transmitting surface provided at a portion corresponding to the outside of the image forming area. The present invention is not limited to this arrangement, but the sensor surface of the synchronization light detection means 108 may be disposed at a position optically equivalent to the surface to be scanned 106 by using a lens 112 as shown in FIGS. 5A, 5B and 5C. By using a bending prism 111 shown in FIGS. 5B and 5C, it is possible to make the optical system compact by bending the optical path, and it is also possible to prolong the optical path length thanks to the refractive index of the prism. Accordingly, it is possible to reduce the total length of the synchronization light detection means 108. In these arrangements, the magnification and the position of the lens 112 may be determined based on the size of the sensor 113 and the spot size on the sensor surface.

Although one light source 101 is provided in this embodiment, red, blue and green semiconductor light sources or the like may be arranged at equivalent positions via color composite means to provide color images by controlling the respective light sources with separate light source drive circuits. In that case, for synchronization light detection, it is sufficient to drive at least one of the multiple light sources.

In the embodiment, two of the reflecting surfaces consisting of the scanning optical system are respectively formed to no-rotational-symmetry surface. However, it is possible to reduce the aberration by forming at least one of the reflecting surface to non-rotational-symmetry surface.

Second Embodiment

Figure 6:
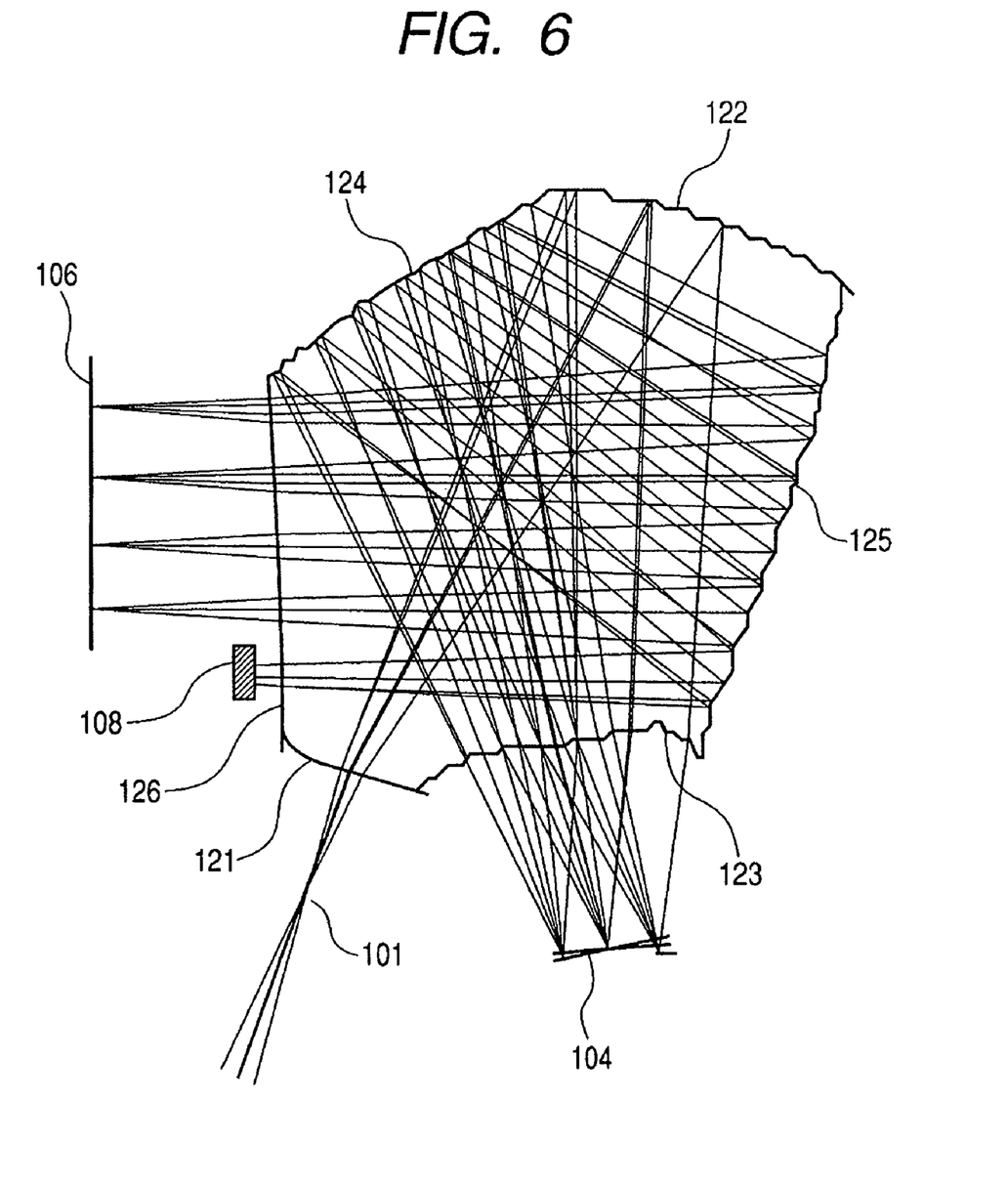
FIG. 6 schematically shows the configuration of a second embodiment of the present invention.

The second embodiment of the present invention will be described with reference to FIG. 6. In the second embodiment, a light source optical system and a scanning optical system are constructed integrally as a prism-like element. In the following, the same reference numerals will designate the same components in the first embodiment, and descriptions thereof will be omitted.

The light source 101 is modulated directly based on an input signal for a displayed image not shown. A light beam emitted from the light source 101 is transmitted through a transmitting surface 121 and incident on a prism-shaped element. The transmitted light beam is reflected by an internal reflecting surface 122, exits from a transmitting surface 123 and enters scanning means 104. These transmitting and reflecting surfaces 121, 122, 123 constitute a light source optical system and function to change the light beam from the light source 101 into a substantially parallel beam.

The light beam incident on the scanning means 104 is scanned by the scanning means 104 in two dimensional directions and transmitted through the transmitting surface 123 again to enter the prism-like element. The transmitted light beam is then reflected by internal reflecting surfaces 124, 125 and exits from the last transmitting surface 126. The light beam is then focused on or in the vicinity of a surface to be scanned 106 as a spot 107. By scanning the light beam 102 by the scanning means 104, the spot 107 moves on the surface to be scanned 106 two-dimensionally. Thus, a two-dimensional image is formed on the surface to be scanned 106 in accordance with modulation of the light source 101.

As per the above, the transmitting surface 123 has an optical function as a part of the light source optical system when light exits out of the prism-like element and an optical function to constitute, in combination with the internal reflecting surfaces 124, 125 and the last transmitting surface 126, the scanning optical system.

In addition, it is possible to reduce the aberration as in the first embodiment by forming at least one of transmitting surfaces and reflecting surfaces 121, 122, 123, 124, 125, 126 to non-rotational-symmetry surface.

In this embodiment also, synchronization light detection means 108 is provided in the vicinity of the last exit surface 126 to detect timing of the scanning light. The synchronization light detection means 108 is disposed at a position corresponding to a position on the surface to be scanned 106 outside the area of the light beam for actually displaying an image, with respect to the vertical scanning direction.

Although one light source 101 is provided in this embodiment, red, blue and green semiconductor light sources or the like and color composite means may be arranged to provide color images by controlling the respective light sources with separate light source drive circuits based on signals from a control circuit of the apparatus. In that case, for synchronization light detection, it is sufficient to drive at least one of the multiple light sources.

A lens 112 and a bending prism 111 shown in FIGS. 5A, 5B and 5C may also be used in the synchronization light detection means 108.

Third Embodiment

Figure 7:
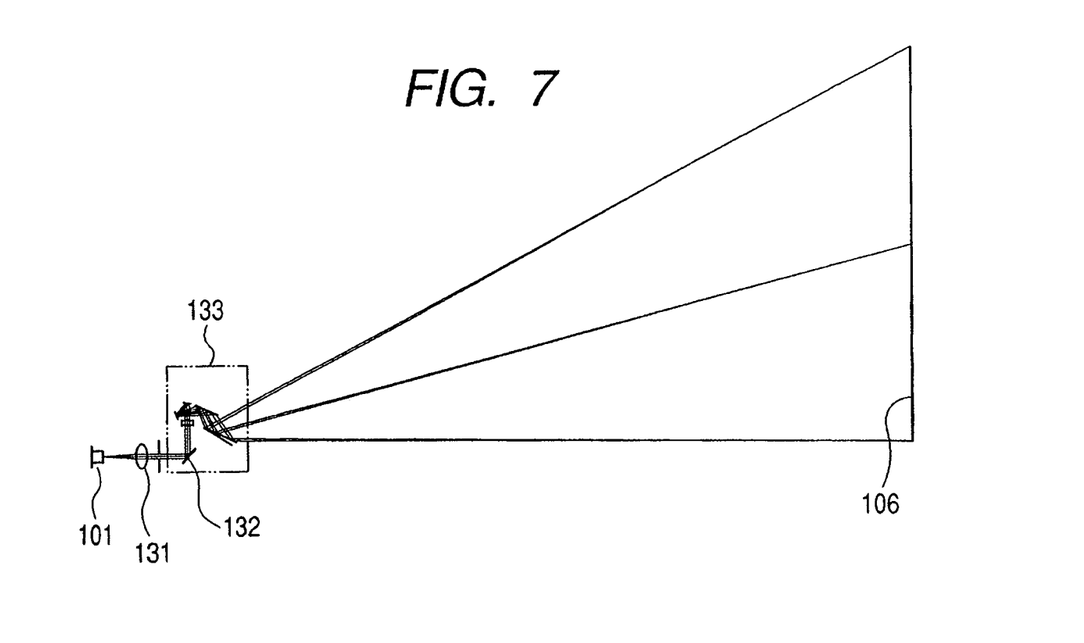
FIG. 7 schematically shows the configuration of a third embodiment of the present invention.
Figure 8:
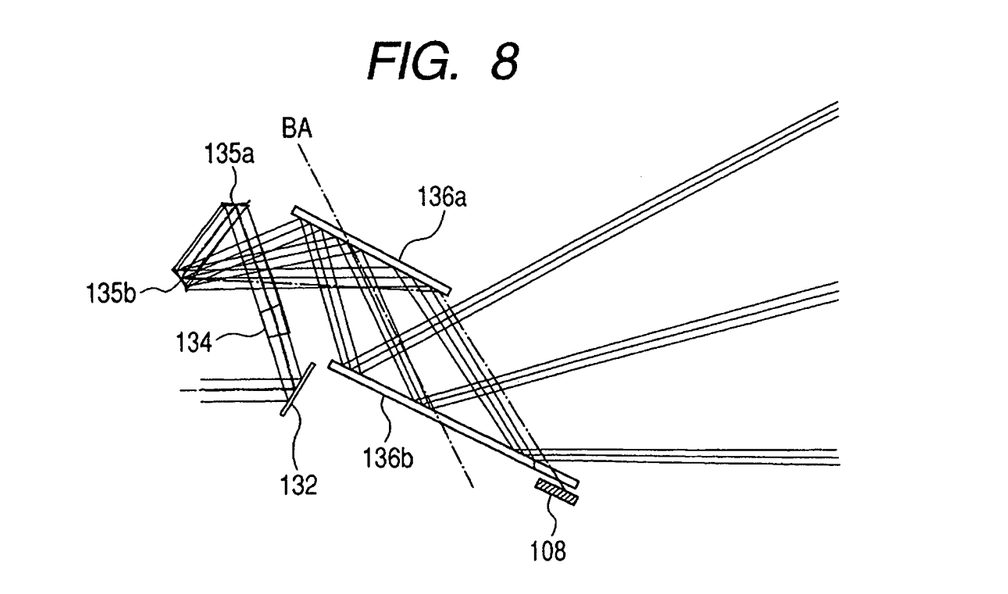
FIG. 8 schematically shows the configuration of the third embodiment of the present invention.

FIGS. 7 and 8 schematically show the configuration of a scanning type image display apparatus according to the third embodiment of the present invention. The scanning type image display apparatus according to this embodiment is a projection type display in which a light beam emitted from a light source 101 is scanned by horizontal scanning means and vertical scanning means to display an image on a screen 106.

The light source 101 is a semiconductor laser or a wavelength conversion light source based on a semiconductor laser. In this embodiment, one light source 101 is used, but the light source may be composed of multiple light sources emitting red light, blue light and green light respectively. The light source 101 is electrically connected with by a light source control circuit not shown and modulated by it. A light beam emitted from the light source 101 is converted into a parallel light beam by a condenser lens 131, and the beam width is regulated by an aperture stop. The light beam having passed through the aperture stop is converted by a converging light conversion optical system 134 into a desired convergent light beam and incident on deflecting means. Reference numeral 135 designates two-dimensional deflecting means (scanning means), which is composed of a deflector 135a having one reflecting surface that can resonate in a one-dimensional direction and a deflecting mirror 135b that can deflect light at a constant angular velocity. A light beam emitted from the light source means 101 is deflected in the horizontal scanning direction by the first deflector 135a and the deflected light beam from the first deflector 135a is further deflected in the vertical scanning direction by the second deflector 135b. In this way, the incident light beam emitted from the light source means 101 is deflected in two dimensional directions by the deflecting means 135. Reference numeral 136 designates a two-dimensional scanning optical system (scanning optical system) composed of two scanning mirrors 136a, 136b, which focuses the light beam that has been two-dimensionally deflected by the deflecting means 135 as a spot in the vicinity of the surface to be scanned 106. The surface to be scanned 106 is scanned with a light beam deflected by the deflecting means 135 by means of the two-dimensional scanning optical system 136. In this way, the first deflecting means 135a effects light scanning in the horizontal direction at a high speed to draw a scanning line, and the second deflecting means 135b effects light scanning in the vertical direction at a low speed to form a two-dimensional image on the screen 106.

A transmitting surface is formed at a portion on the last reflecting surface or the scanning mirror 136b that corresponds to the outside of the image formation area, and timing of scanning light transmitted through the transmitting surface is detected by synchronization light detection means 108. By forming a transmitting surface for allowing light to enter the synchronization light detection means 108 on a portion on the last exit surface 135b corresponding to the outside of the image formation area as with this embodiment, it is possible to enhance accuracy in setting the position of the synchronization light detection means 108. In addition, interference with the optical path of the scanning light for actually displaying an image is prevented, and accordingly, a decrease in the brightness of the displayed image will not occur.

In this embodiment also, detection of synchronization of a scanned image can be performed in a similar manner as in the other embodiments. The optical systems shown in FIGS. 5A to 5C can also be applied to this embodiment.

In projection type displays like this embodiment that displays an image on the screen 106 by scanning a light beam from the light source 101 using the scanning means 105, it is necessary to dispose the synchronization light detection means 108 on the projection apparatus. Therefore, it is preferred to use a lens 112 shown in FIGS. 5A, 5B or 5C and dispose the sensor surface 113 of the synchronization light detection means 108 at a position optically equivalent to the surface to be scanned 106, in realizing an appropriate spot size on the sensor surface 113.

The shapes of the scanning mirrors 136a, 136b in this embodiment are free curved surface shapes represented by the polynomial of X and Y indicated as formula (1). The reflecting surfaces of the scanning mirrors 136a, 136b are non-rotational-symmetry surfaces that are symmetrical with respect to reference axis BA with respect to the horizontal direction, but asymmetrical in the vertical scanning direction. In addition, they are set in a shifted or tilted state with respect to the vertical scanning direction.

In the case of an image display apparatus that projects an image obliquely with respect to the vertical scanning direction as is the case with this embodiment, the scanned image displayed on the screen 106 includes trapezoidal distortion in which the horizontal width of the scanned image gradually increases from the bottom to the top. Such trapezoidal distortion can be effectively corrected by using two or more scanning mirrors having non-rotational-symmetry surfaces and tilting them with respect to the vertical scanning direction to fold the optical path of the deflected light beam.

The scanning type image display apparatus according to the present invention is not limited to a projection type display apparatus in which an image formed on the surface to be scanned is viewed directly, but it may be an image display apparatus such as an electronic viewfinder system in which a viewing optical system is provided between the surface to be scanned and the viewer.

According to the present invention, in a scanning type image display apparatus that performs two-dimensional reciprocating raster scanning of a light beam emitted from a light source, it is possible correct positional differences of images in reciprocating scanning without overlap of the light beam drawing images and the light beam used for synchronization detection. In particular, by providing synchronization light detection means on a portion of the last exit surface corresponding to the outside of the image formation area, it is possible to enhance accuracy in setting the position of the synchronization light detection means.

This application claims priority from Japanese Patent Application No. 2005-050258 filed Feb. 25, 2005, which is hereby incorporated by reference herein.

What is claimed is:

1. A scanning type image display apparatus comprising:
    a light source for emitting a light beam that is modulated based on image information;
    scanning means for scanning said light beam in two dimensional directions;
    a scanning optical system for forming an image of said light source on a surface to be scanned;
    light beam detection means for detecting said light beam transmitted through an area of a last surface of said scanning optical system, that is outside an effective area; and
    a synchronization control circuit that controls light emitting timing of said light source based on a signal from said light beam detection means.

2. A scanning type image display apparatus comprising:
    a light source for emitting a light beam that is modulated based on image information;
    scanning means for scanning said light beam in two dimensional directions;
    a scanning optical system for forming an image of said light source on a surface to be scanned, a last surface of said scanning optical system including a reflecting area that reflects an effective light beam for forming an image on said surface to be scanned and a light transmitting area provided outside the reflecting area;
    light beam detection means for detecting a light beam transmitted through said light transmitting area; and
    a synchronization control circuit that controls light emitting timing of said light source based on a signal from said light beam detection means.

3. A scanning type image display apparatus according to claim 1, wherein said scanning optical system is composed of two mirrors including at least one non-rotational-symmetry surface.

4. A scanning type image display apparatus according to claim 1, wherein the optical path length from the last surface of said scanning optical system to said surface to be scanned is equal to the optical path length from said last surface to said light beam detection means.

5. A scanning type image display apparatus according to claim 1, wherein said scanning means comprises a resonantly-operating reflection type deflecting means, and the image of said light source is displayed in forward paths and backward paths of oscillating operation caused by the resonant operation.

6. A scanning type image display apparatus according to claim 1, wherein said synchronization control circuit controls image display positions in forward and backward paths of said reflection type deflecting means based on a signal from said light beam detection means.

7. A scanning type image display apparatus according to claim 1, wherein said scanning optical system comprises a single optical element having three or more optical surfaces, and said optical element has at least one non-rotational-symmetry surface.

8. A scanning type image display apparatus according to claim 1 further comprising a viewing optical system provided between said surface to be scanned and a viewer.

* * * * *